United States Patent [19]

Hata et al.

[11] 4,168,683
[45] Sep. 25, 1979

[54] FEEDBACK CONTROL SYSTEM FOR RECIRCULATION OF EXHAUST GAS

[75] Inventors: Yoshitaka Hata, Fujisawa; Kenji Ikeura, Yokosuka; Michiyoshi Yamane, Tokyo, all of Japan

[73] Assignee: Nissan Motor Company, Limited, Japan

[21] Appl. No.: 852,351

[22] Filed: Nov. 17, 1977

[30] Foreign Application Priority Data

Nov. 30, 1976 [JP] Japan .................................. 51-144493

[51] Int. Cl.² ............................................ F02M 25/06
[52] U.S. Cl. ............................ 123/119 A; 123/119 EC
[58] Field of Search .................... 123/119 A, 119 EC; 60/276, 285

[56] References Cited

U.S. PATENT DOCUMENTS

| | | | |
|---|---|---|---|
| 2,355,090 | 8/1944 | Love et al. | 123/119 EC |
| 3,825,239 | 7/1974 | Rice | 123/119 EC |
| 3,885,540 | 5/1975 | Stadler | 123/119 A |
| 3,927,523 | 12/1975 | Shioyama et al. | 123/119 A |
| 3,963,011 | 6/1976 | Saito | 123/119 A |
| 4,018,198 | 4/1977 | Williams | 123/119 A |
| 4,043,305 | 8/1977 | Henault | 123/119 A |
| 4,060,065 | 11/1977 | Hata | 123/119 A |
| 4,061,117 | 12/1977 | Ikeura | 123/119 EC |
| 4,071,003 | 1/1978 | Aono | 123/119 A |
| 4,075,992 | 2/1978 | Linder | 123/119 A |

Primary Examiner—Wendell E. Burns
Attorney, Agent, or Firm—Lane, Aitken & Ziems

[57] ABSTRACT

An exhaust gas recirculation control system for an internal combustion engine, in which a feedback signal representing the amount of actually recirculated exhaust gas is produced by detecting the concentration of either $CO_2$ or $H_2O$, which is contained in the exhaust gas in a nearly constant concentration, in combustible gas mixture diluted with recirculated exhaust gas.

8 Claims, 1 Drawing Figure

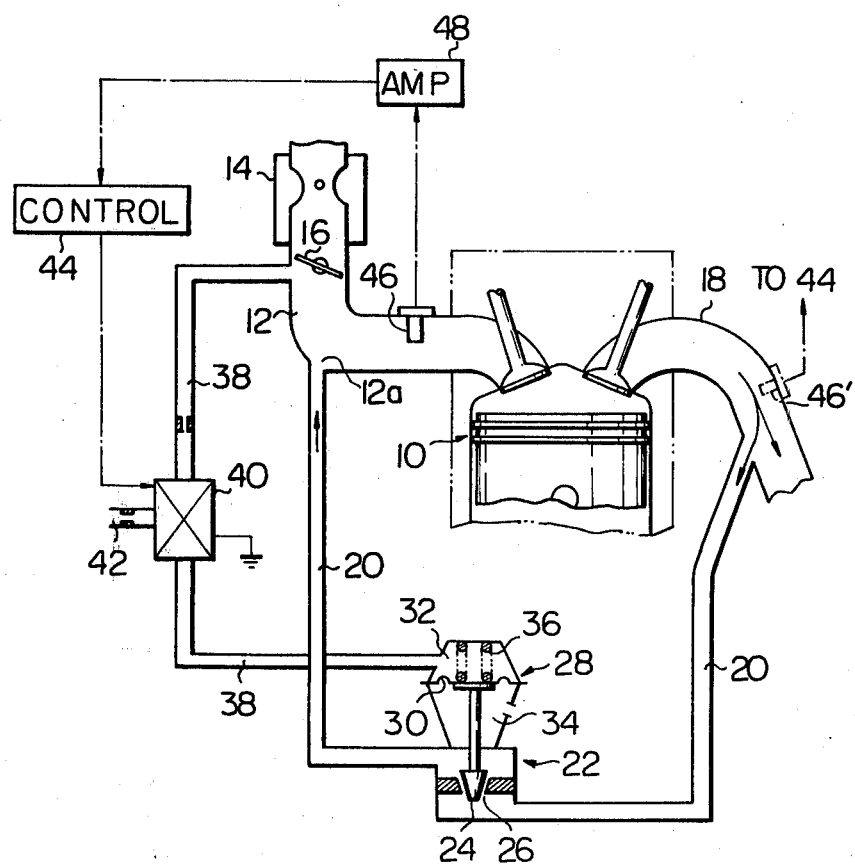

FEEDBACK CONTROL SYSTEM FOR RECIRCULATION OF EXHAUST GAS

BACKGROUND OF THE INVENTION

This invention relates to feedback control of the recirculation of exhaust gas through an internal combustion engine, particularly an automotive engine.

Concerning the prevention of air pollution attributable to exhaust gas of internal combustion engines, particularly of atomotive use, the recirculation of a portion of exhaust gas back into the engine intake is a widely employed technique for suppressing the emission of NOx. The recirculation of exhaust gas (EGR) has the effect of lowering the maximum combustion temperature in the engine combustion chambers so that the formation of NOx can be suppressed.

The suppressive effect of EGR on the formation of Nox is enhanced as the volume of the recirculated exhaust gas relative to the volume of fresh air admitted into the engine is increased (this volume ratio will herein be referred to as EGR rate). To maintain NOx emission below a permissible level, there is a need of effecting EGR at considerably high EGR rates. On the other hand, the employment of high EGR rates tend to cause instability of the engine operation. Accordingly the EGR rate must be controlled in dependence on the operating condition of the engine and high precision is required of the control especially when high EGR rates are involved in the scope of the control.

In conventional EGR control systems, it is a usual way of operating an EGR control valve to use a vacuum-operated actuator which is connected to the induction passage of the engine such that the EGR control valve is operated in dependence on the magnitude of vacuum produced either at a venturi section of the induction passage or in the neighborhood of a main throttle valve. In this type of EGR control systems, the control is accomplished in a programmed manner so as to regulate the EGR rate to a target value which is preset based on an assumed relationship between the EGR rate or the aforementioned vacuum and the condition of combustion in the engine. The magnitude of a carburetor venturi vacuum, for example, is of course an indication of the volume flow rate of air in the induction passage, but there is a limitation to the precision in the control of EGR when the control valve is operated merely on the basis of, for example, the venturi section vacuum. It is inevitable that a considerable fluctuation occurs in an actualized EGR rate with changes in the engine operating condition, possibly causing instability of the engine operation, increase in fuel consumption and/or failure in maintaining a satisfactorily low level of NOx emission, but such fluctuation cannot be corrected insofar as the actualized EGR rate is not detected.

SUMMARY OF THE INVENTION

It is an object of the present invention to provide an EGR control system of a feedback control type for internal combustion engines, which system has the advantage that a feedback signal representing an actualized EGR rate is produced by a simple method.

An EGR control system according to the invention has a flow control valve to regulate the volume flow rate of the exhaust gas in an exhaust recirculation passage connected to an induction passage, a sensor means for detecting the amount of recirculated exhaust gas in a gas mixture flowing in the induction passage at a location downstream of the junction of the induction and recirculation passages and producing an electrical signal representing the sensed amount, a control circuit which produces a control signal based on the signal produced by the sensor means, and an actuator means for operating the control valve in response to the control signal. This control system is characterized in that the sensor means is a gas concentration sensor to measure a particular component of the exhaust gas the amount of which component in the exhaust gas is nearly constant during operation of the engine. A preferred example of such a component is carbon dioxide, but it is also possible to choose steam as such a component.

Since the amount of either carbon dioxide or steam in the exhaust gas per se can be regarded practically as constant, the output of the sensor in this control system implies an actualized EGR rate. Accordingly this control system accomplishes feedback control of the EGR rate. When there occurs any deviation of the actualized EGR rate from an intended rate, the flow rate of the exhaust gas in the recirculation passage is minutely regulated with good responsiveness until the deviation is cancelled by the operation of the valve actuator under the command of the control circuit.

Thus the control system according to the invention can realize an intended EGR rate under any operating condition of the engine so that both the suppression of NOx formation and the maintenance of a stable engine operation can be achieved as desired. Besides many advantages common to feedback control systems utilizing electrical signals, the control system of the invention has an additional advantage that the feedback signal is produced by a simple method compared with an orthodox method in which are measured the flow rate of the air in the induction passage and that of the recirculated exhaust gas. The control system of the invention, therefore, is quite suitable for application to automotive engines.

BRIEF DESCRIPTION OF THE DRAWING

The single FIGURE is a diagrammatic presentation of an exhaust gas recirculation system as an embodiment of the invention.

DESCRIPTION OF PREFERRED EMBODIMENTS

In the drawing FIGURE, a fuel system for an automotive internal combustion engine 10 has an induction passage 12 equipped with a carburetor 14 and a throttle valve 16. Branched from an exhaust passage 18 for this engine 10 there is an exhaust gas recirculation (EGR) passage 20 to interconnect the exhaust passage 18 to the induction passage 12 at a section 12a downstream of the throttle valve 16 for the purpose of recirculating a portion of the exhaust gas to the engine 10. A conventional EGR control valve 22 is associated with the EGR passage 20 to control the volume flow rate of the exhaust gas through this passage 20. In the illustrated case the control valve 22 has a tapered valve member 24 disposed in an orifice 26 constituting a section of the passage 20. A vacuum-operated valve actuator 28 for moving the valve member 24 has a diaphragm 30 which holds the stem of the valve member 24 and serves as a partition between a vacuum chamber or working chamber 32 and an atmospheric pressure chamber 34. A spring 36 is installed in the working chamber 32 to bias the diaphragm 30 towards the atmospheric pressure chamber 34. An intake vacuum produced by the operation of the engine 10 is applied to the working chamber 32 through the passage 38, and the valve member 24 is arranged such that an effective cross-sectional area of the orifice 26 increases as the magnitude of vacuum applied to the working chamber 32 increases.

An electromagnetic valve 40 is associated with the vacuum transmission passage 38 to admit air at a variable rate into this passage 38 through an air admission passage 42 and is operated by the output of an electronic control circuit 44. A carbon dioxide sensor 46 is disposed in the induction passage 12 at a location downstream of the junction 12a of the EGR passage 20 and the induction passage 12, for example in an intake manifold (not illustrated). The $CO_2$ sensor 46 is required of producing an electrical signal representing the concentration of $CO_2$ in a gas mixture passing through the induction passage 12. For example, the $CO_2$ sensor 46 is a device having a $CO_2$-sensitive semiconductor element, an instrument for measuring dielectric constant of gas or an infrared gas analyzer. The output of the $CO_2$ sensor 46 is put into the control circuit 44 via an amplifier 48. The control circuit 44 includes a comparator to compare the output of the $CO_2$ sensor with a reference signal which implies a $CO_2$ concentration corresponding to an intended amount of the exhaust gas in the gas mixture supplied to the engine 10. The output of the control circuit 44 is a power signal for operating the electromagnetic valve 40 and varies so as to cancel any deviation of the input signal (provided by the $CO_2$ sensor) from the reference signal by regulating the admission of air into the vacuum transmission passage 38 through the electromagnetic valve 40. This means the regulation of the magnitude of vacuum applied to the actuator 28 such that the opening area of the EGR control valve 22 is varied until realization of an intended EGR rate.

The control system may optionally comprise additional sensors (not shown) for utilizing certain operating parameters of the engine 10, for example engine speed and/or intake vacuum, also as inputs to the control circuit 44 with the purpose of modifying the output of the circuit 44 such that the EGR rate is lowered when the engine 10 is operated under certain condition requiring particularly smooth and/or efficient engine operation as exemplified by a high speed low load condition, a high speed high load condition and a low speed low load condition.

There will be no need of explaining the particulars of the control circuit 44 since analogous electronic control circuits are well known in connection with feedback control of air-to-fuel ratio in fuel systems for internal combus,ion engines.

The use of the $CO_2$ sensor 46 as means for providing a feedback signal in this EGR control system is based on the following way of thinking.

The rate of EGR is defined as the volumetric ratio of the recirculated exhaust gas to the air admitted into the combustion chambers of the engine 10. In general the concentration of $CO_2$ in the exhaust gas does not exhibit a significant fluctuation over a practicable range of the air-to-fuel ratio for operating the engine and is usually within the range of about 13–15% by volume for gasoline engines. The $CO_2$ concentration in the air-fuel mixture supplied from the carburetor 14 can be regarded practically 0%. When the exhaust gas is introduced into the air-fuel mixture, therefore, the $CO_2$ concentration in the resultant gas mixture is proportional to the amount of the introduced exhaust gas. For example, a $CO_2$ concentration of 1.3–1.5 Vol% in this gas mixture implies an EGR rate of about 10%.

Thus, an actualized rate of EGR can be detected accurately by means of the $CO_2$ sensor 46, so that it is possible to accomplish feedback control of EGR without measuring actual flow rates of the exhaust gas in the recirculation passage 20 and the air in the induction passage 12.

It is necessary for an accurate detection of the actualized EGR rate that the air-fuel mixture and the recirculated exhaust gas be well mixed with each other before the contact of the resultant gas mixture with the $CO_2$ sensor 46. Accordingly the $CO_2$ sensor 46 should be located at a sufficiently long distance downstream from the junction 12a of the recirculation passage 20 and the induction passage 12. When the $CO_2$ sensor 46 is an infrared gas analyzer, the sensor 46 is arranged so as to accomplish the analysis by sampling a small amount of the gas mixture.

The operation of the above described EGR control system will have already been grasped. If the concentration of $CO_2$, i.e. the rate of EGR, represented by the signal supplied from the sensor 46 is higher than an intended value, the control circuit 44 accomplishes a corrective function so as to provide a power signal to the electromagnetic valve 40 to allow the admission of a sufficiently large quantity of air into the vacuum transmission passage 38 thereby to decrease the magnitude of vacuum applied to the valve actuator 28. Then the diaphragm 30 deflects towards the atmospheric pressure chamber 34 with the result that the valve member 24 changes its position to decrease an effective cross-sectional area of the orifice 26. As a consequence a decrease occurs in the volume of the recirculated exhaust gas. The output of the control circuit 44 continues to fluctuate until realization of an intended $CO_2$ concentration in the gas mixture coming into contact with the sensor 46. When the detected $CO_2$ concentration is lower than the expected one, the opening area of the control valve 22 is increased by diminishing or interrupting the admission of air into the vacuum transmission passage 38 through the electromagnetic valve 40. Thus any deviation of the EGR rate from the intended rate can be cancelled in a short time, resulting in the success in effective suppression of NOx formation under almost every condition of the engine operation without a sacrifice of the engine performance.

As mentioned hereinbefore, it is possible to alter the goal of the EGR control under certain condition of the engine operation. For example, the control circuit 44 may command the electromagnetic valve 40 to greatly decrease the magnitude of vacuum transmitted to the valve actuator 28 thereby to reduce the fuel consumption under a high speed low load condition where a significant NOx formation is unlikely.

In principle, the precision in the control of the EGR rate can be enhanced by the provision of another $CO_2$ sensor (indicated at 46') in either the exhaust passage 18 or the recirculation passage 20 to detect an actual $CO_2$ concentration in the exhaust gas instead of assuming that the concentration is constantly, for example, 14%. However, the described EGR control system operates with practically sufficiently high precision even when the $CO_2$ concentraiton in the exhaust gas is assumed to be constant. Particularly in current automotive internal combustion engines, their fuel systems are constructed so as to maintain an optimum air-to-fuel ratio with high precision and accordingly the $CO_2$ concentration in the exhaust gas of each engine does not exhibit a significant fluctuation during operation of the engine.

Besides $CO_2$, steam ($H_2O$) too is contained in the exhaust gas practically in a constant concentration and hence can be employed instead of $CO_2$ as a component representing the amount of the recirculated exhaust gas in the above described EGR control system. The atomic ratio of C to H in gasoline is approximately 1:2.1. Assuming for simplicity that the combustion of gasoline produces CO, $CO_2$, $H_2$ and $H_2O$, the molar ratio of (CO+$CO_2$) to ($H_2$+$H_2O$) in the exhaust gas can be regarded approximately as 1:2. Since both CO and $H_2$ are present in the exhaust gas only in practically negligible concentrations, the concentration of $H_2O$ (steam) in the exhaust gas can be regarded as proportional to the concentration of $CO_2$.

It is possible, therefore, to replace the $CO_2$ sensor 46 in the illustrated system by a humidity sensor which provides an electrical signal representing a detected steam concentration. For example, a device having a humidity sensitive semiconductor element or an instrument for measuring insulation resistance is useful as this steam sensor. For accurate measurement, the steam sensor would be designed so as to accomplish the measurement of absolute humidity for a sampled portion of the gas mixture (of the air-fuel mixture and the recirculated exhaust gas) with continued heating to prevent condensation of steam in the sample.

In practical application of an EGR control system according to the invention to an automotive internal combustion engine, it is desirable that the fuel system for the engine is provided with a known air-to-fuel ratio control system in which a feedback signal is provided by an oxygen sensor disposed in the exhaust passage.

What is claimed is:

1. A feedback control system for controlling the recirculation of exhaust gas from an exhaust passage of an internal combustion engine to an induction passage of the engine through an exhaust recirculation passage, the system comprising:

a flow control valve to vary the volume flow rate of the exhaust gas in the exhaust recirculation passage;

a sensor means for sensing the concentration of a component of the exhaust gas in a gas mixture flowing in the induction passage at a location downstream of the junction of the induction passage and the exhaust recirculation passage and producing an electrical signal representing the sensed concentration, said component being a gaseous substance the amount of which in the exhaust gas being nearly constant during operation of the engine;

a control means for producing a control signal based on said electrical signal, said control signal indicating a decrease in the volume flow rate of the exhaust gas in the recirculation passage when said electrical signal implies that said concentration is higher than a reference value and an increase in said volume flow rate when said electrical signal implies that said concentration is lower than said reference value; and an actuator means for operating said control valve in response to said control signal.

2. A control system as claimed in claim 1, wherein said component of the exhaust gas is carbon dioxide.

3. A control system as claimed in claim 1, wherein said component of the exhaust gas is steam.

4. A control system as claimed in claim 1, further comprising a second sensor means for sensing the concentration of said component in the exhaust gas flowing through said exhaust passage and producing an electrical signal representing the sensed concentration, said control means having an additional function of modifying said reference value based on said electrical signal produced by said second sensor means.

5. A control system as claimed in claim 1, wherein said actuator means comprise a vacuum-operated actuator connected to the induction passage through a vacuum transmission passage for operating said control valve such that the opening area of said control valve increases as the magnitude of vacuum applied to said actuator increases and an electromagnetic valve arranged to admit a variable quantity of air into said vacuum transmission passage in response to said control signal.

6. A method of controlling the recirculation of a portion of exhaust gas of an internal combustion engine through the engine, comprising the steps of:

measuring the concentration of a component of the exhaust gas in a gas mixture which is produced by the admission of the recirculated exhaust gas into an induction passage for the engine, said component being a gaseous substance the amount of which in the exhaust gas is nearly constant during operation of the engine;

comparing the measured concentration with a reference value; and regulating the quantity of the exhaust gas being recirculated so as to decrease said quantity when the measured concentration is higher than said reference value and increase said quantity when the measured concentration is lower than said reference value.

7. A method as claimed in claim 6, wherein said component is carbon dioxide.

8. A method as claimed in claim 6, wherein said component is steam.

* * * * *